May 5, 1959 H. SPENGLER ET AL 2,884,783
PHOTOELECTRIC APPARATUS FOR MEASURING AND REMOTE
READING OF LIQUID LEVELS
Filed Jan. 26, 1954 9 Sheets-Sheet 1

INVENTORS:
HERBERT SPENGLER
KURT BISCHOFF
HERBERT DREESKAMPF

Bailey, Stephens & Huettig
ATTORNEYS

May 5, 1959  H. SPENGLER ET AL  2,884,783
PHOTOELECTRIC APPARATUS FOR MEASURING AND REMOTE
READING OF LIQUID LEVELS
Filed Jan. 26, 1954  9 Sheets-Sheet 2

INVENTORS:
HERBERT SPENGLER
KURT BISCHOFF
HERBERT DREESKAMP

Bailey, Stephens & Huettig
ATTORNEYS

May 5, 1959  H. SPENGLER ET AL  2,884,783
PHOTOELECTRIC APPARATUS FOR MEASURING AND REMOTE
READING OF LIQUID LEVELS
Filed Jan. 26, 1954  9 Sheets-Sheet 3

INVENTORS:
HERBERT SPENGLER
KURT BISCHOFF
HERBERT DREESKAMPF
Bailey, Stephens & Huettig
ATTORNEYS

INVENTORS:
HERBERT SPENGLER
KURT BISCHOFF
HERBERT DREESKAMPF
Bailey, Stephens & Huettig
ATTORNEYS May 5, 1959  H. SPENGLER ET AL  2,884,783
PHOTOELECTRIC APPARATUS FOR MEASURING AND REMOTE
READING OF LIQUID LEVELS
Filed Jan. 26, 1954  9 Sheets-Sheet 6

INVENTORS:
HERBERT SPENGLER
KURT BISCHOFF
HERBERT DREESKAMPF
Bailey, Stephens + Huettig
ATTORNEYS

:United States Patent Office 2,884,783
Patented May 5, 1959

2,884,783
PHOTOELECTRIC APPARATUS FOR MEASURING AND REMOTE READING OF LIQUID LEVELS

Herbert Spengler, Oberhausen-Sterkrade, Kurt Bischoff, Oberhausen-Holten, and Herbert Dreeskampf, Mulheim an der Ruhr, Germany, assignors to Ruhrchemie Aktiengesellschaft, Oberhausen-Holten, Germany, a German corporation Application January 26, 1954, Serial No. 406,244

Claims priority, application Germany February 12, 1953

4 Claims. (Cl. 73—290)

This invention relates to methods and apparatus for measuring and remote reading of liquid levels in glass gauges, preferably to a method adapted to be used in central steam power plants, waterworks, tanks, chemical reaction vessels and many other industrial plants requiring continuous and as exact as possible surveying of liquid levels by means of the glass gauges containing the liquid.

Often the liquids to be observed are under high pressure and have high temperatures and/or chemically attacking properties. In many cases the glass guage used cannot be built into the plants in such a way that they may be observed directly from one controlling or surveying location, especially from a central measuring plant.

In such cases the liquid level must be visible by remote reading, at the location where the works are surveyed. The remote transmission of liquid levels by floats or similar mechanical devices is technically difficult, especially if high pressures, high temperatures and/or attacking liquids are to be taken in consideration. In many cases it is of special value that the transmission be performed without any real power and without delay, a condition which may be only realized with difficulty with mechanical and similar means. Besides, remote transmissions should be devised in such a way that no installations are provided at the glass gauge, preventing it from being directly observed.

A remote reading must be free of errors and must avoid any incorrect indication. No measuring value must appear or remain at the indicating device which value does not exactly correspond to the actual level of the liquid. Disturbances of the apparatus used for remote reading must be recognized at once by the observer so that measuring values fail to come at all.

To perform these conditions, television installations have already been used for remote reading of liquid levels transmitting an image of the glass gauge containing the liquid to the desired place. Such television installations, however, are very expensive and are easily disturbed or damaged under the conditions of industrial, especially chemical, plants.

According to one feature of the present invention, a reliably working, faultless remote reading of liquid levels may be obtained with relatively simple apparatus by lighting the glass gauge over its entire length, periodically scanning the sudden changes of the optical light properties produced at the separating surface between the liquid and gaseous media in the glass gauge, transforming said changes into electric pulses, and applying said pulses to an electric indicating means, indicating said pulses as a function of time of the scanning process.

According to another feature of the invention this method may be performed by periodically moving a pencil of light rays along the liquid in the glass gauge over its entire length so as to meet the separating surface between the liquid and gaseous media in said glass gauge, scanning the sudden changes of the properties of the light produced at the said separating surface, transforming said changes into electric pulses, and applying said pulses to an electric indicating means, indicating said pulses as a function of time of the scanning process.

According to still a further feature of the invention the method mentioned before may be performed by periodically moving a receiver comprising an objective and a photoelectric cell along the liquid in the glass gauge over its entire length, thereby scanning the sudden changes of the optical properties of the light produced at the separating surface between the liquid and gaseous media in said glass gauge, transforming said changes into electric pulses, and applying said pulses to an electric indicating means, indicating said pulses as a function of time of the scanning process.

The invention also relates to apparatus for performing the said new methods.

Many other features of the invention may be seen from the following specification and from the claims and the drawings annexed thereto.

The drawings show by way of example schematically different embodiments of devices for performing the methods according to the invention by way of example.

In the individual embodiments illustrated in the drawings, identical elements or elements having identical functions are designated with the same reference numerals for the sake of clearness.

Figs. 1 to 4 of the drawings illustrate schematically some scanning methods adapted to be used, according to the invention, for surveying liquid levels. In these figures, the glass gauge containing the liquid is designated with the reference numeral 1 and the "phase limit surface," i.e., the separating surface between the two portions of the glass gauge filled with liquid and with vapour or gas respectively, is designated with the reference numeral 2.

According to Fig. 1 a rotating or otherwise periodically moved light source 3 may be used, the movement of which is controlled in such a way that the light ray passes from above to below or from below to above along the entire length of the glass gauge 1. The pencil of rays emitted by the light source 3 is reflected, generally totally, by the underside of the separating surface, to a photoelectric cell 4.

If it is desired to have the pencil of rays reflected from the upper side of the liquid limit surface, a rotating light source 5 and a photoelectric cell 6 may be used, arranged in a corresponding manner.

Figures 1, 2, 3, 4:
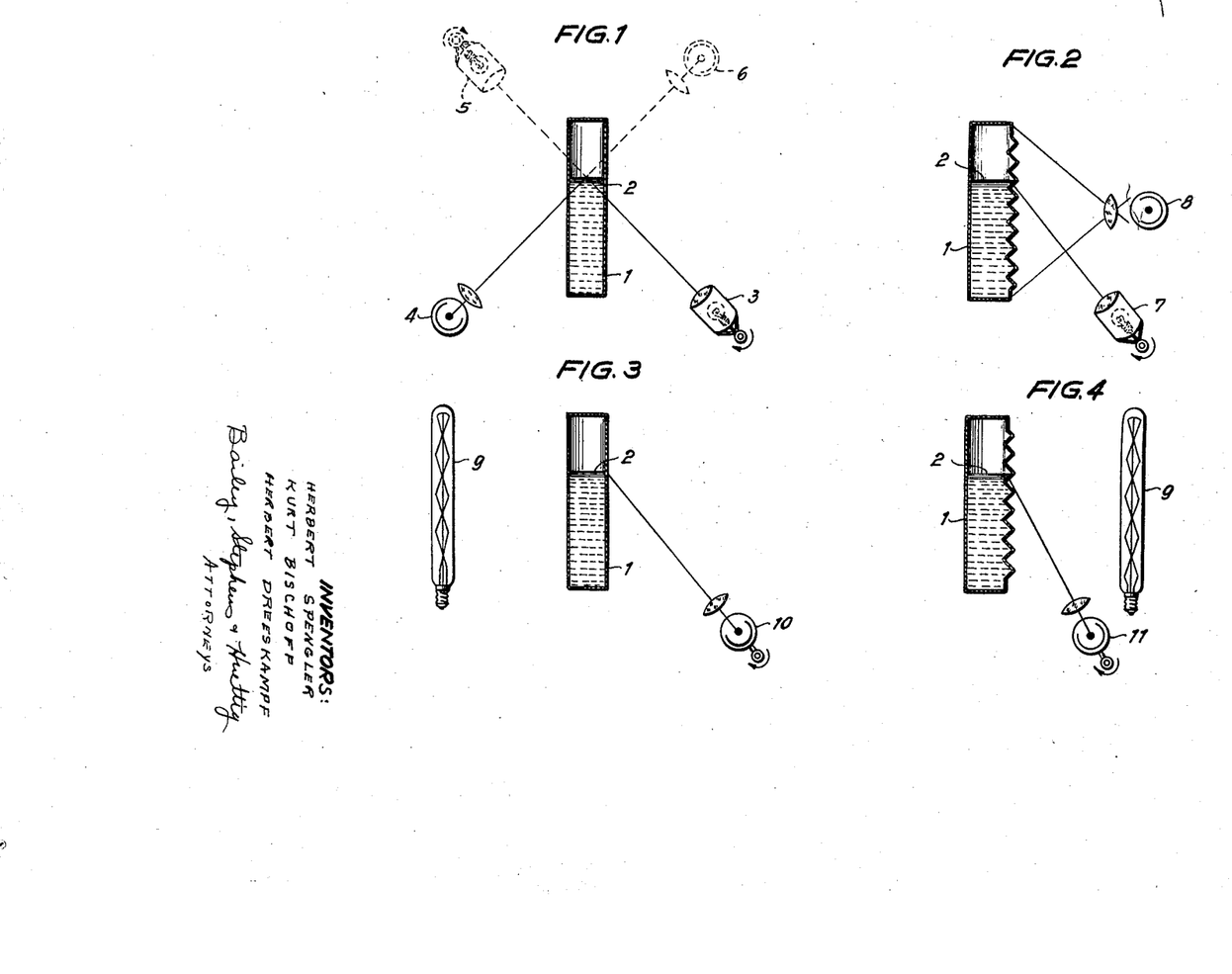
Fig. 1 illustrates an apparatus in which the separating surface between the liquid and the gaseous media in a glass gauge is scanned by a pencil of light rays.
Fig. 2 illustrates a modified glass gauge which is only accessible from one side, a light source and a photoelectric cell being positioned at the same side of the gauge.
Fig. 3 shows an apparatus in which a receiver consisting of an objective and a photoelectric cell is used for scanning the glass gauge.
Fig. 4 shows a similar apparatus in combination with a glass gauge accessible only from one side, Fig. 5 schematically illustrates the method of scanning the liquid level and of transmitting the obtained results to an indicating device.

As may be seen from Fig. 2, the method according to the invention may also be employed with glass gauges which are only accessible from one side. Such glass gauges are normally provided with a corrugated or fluted glass pane so that a large difference of brightness exists between the two portions of the glass filled with liquid and with vapour or gas respectively. If an image is formed of the glass gauge on a photoelectric cell by means of photographic optics, and the image is scanned with a rotating light source, then the intensity of the reflected light is abruptly altered if the light ray moving along the glass gauge passes the phase limit surface 2. Such abrupt alteration of the intensity is received by the photoelectric cell 8 and may be used, after being appropriately amplified, for the indication and remote reading of the liquid level according to the invention.

If the glass gauge is transparent at opposite sides, as in Fig. 1, the arrangement shown in Fig. 3 may also be used for performing the new method. In this case the glass gauge is lighted by a light source or a light wall 9. A receiver 10 is used as scanning device, said receiver consisting, e.g., of an objective and a photoelectric cell rotating around a centre point or moved periodically from top to bottom along the glass gauge. This receiver is preferably provided with the smallest possible picture angle. During the scanning movement, an alteration of the intensity takes place in the photoelectric cell 10 when the phase limit surface 2 is passed, which alteration may be used, after being appropriately amplified, for indicating the liquid level 2 in the glass gauge 1.

In the same way the method according to the invention may be performed in combination with a glass gauge lighted from the front side, as illustrated schematically in Fig. 4. The glass gauge 1, which is provided with a corrugated or fluted glass pane, is lighted by a light source 9. The receiver 11, consisting of an objective and a photoelectric cell rotates around an axis, thereby scanning the entire length of the glass gauge with the smallest possible picture angle. When passing the phase limit surface 2, the photoelectric cell shows the alteration of intensity already mentioned, which alteration may be used, by means of amplifying devices, for measuring and remote reading of the liquid level.

Having now generally described and illustrated different possibilities of scanning optically the liquid level to be transmitted, the remote reading of the liquid level employed according to the invention will be described only with reference to the embodiment shown in Fig. 1 of the drawings. According to this embodiment, a rotating light ray is used, which is reflected from the underside of the phase limit surface. The scanning methods illustrated in Figs. 2 to 4 may be used for remote reading in generally the same way with corresponding installations.

Figure 5:
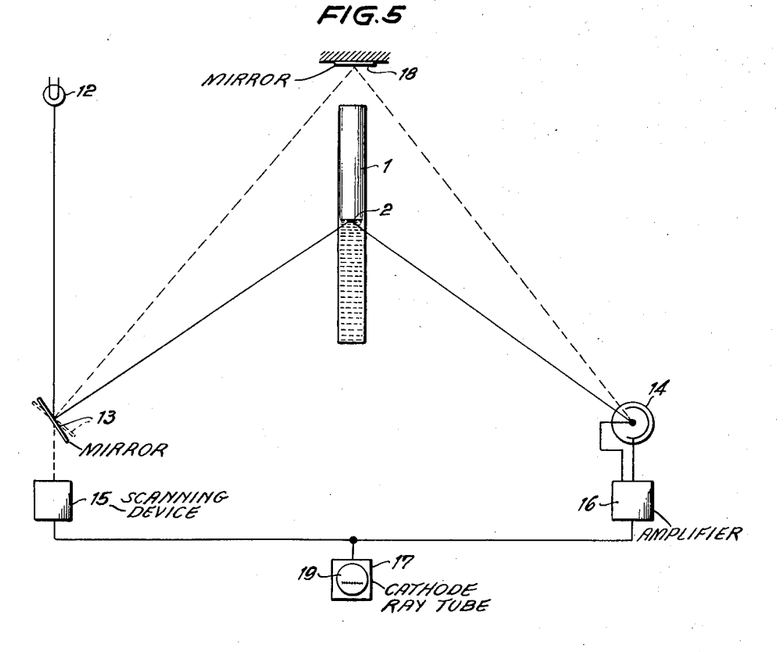

Fig. 5 schematically illustrates the method of scanning the liquid level and the spatial and temporal association of the scanning procedure and its transmission to an indicating device.

A light source 12 projects a narrow pencil of parallel rays onto a rotating mirror 13. In Fig. 5, this mirror 13 is shown in a position in which the light of the light source 12, reflected by it, is reflected from the underside of the phase limit surface 2 and is projected onto the photoelectric cell 14. During the rotation of the mirror 13, the pencil of rays reflected from it passes along the entire surface of the glass gauge 1. Due to the reflection, an electric pulse is generated in the photoelectric cell 14 if the pencil of rays passes the limit surface 2. For geometrically optical reasons, in this case a definite relationship exists between the position of the phase limit surface 2 in the glass gauge and the angular position of the rotating mirror 13.

Each position of the rotating mirror, and therewith the corresponding position of the pencil of rays scanning the liquid level is transformed, by a device 15 explained in more detail later on, into an electric value associated in a well defined manner with the angle of rotation of the mirror 13, preferably into an electric voltage. This voltage becomes visible, simultaneously with the pulse delivered by the photoelectric cell 14 and amplified by the amplifier 16, in an indicating device 17.

If a stationary mirror 18 is associated with the glass gauge 1, e.g. above the glass gauge, a pencil of rays is reflected into the photoelectric cell 14 also by the mirror 18 when the rotating mirror 13 is in a certain position. In this way, during one scanning process, two pulses are generated in the photoelectric cell 14, the time interval between said pulses being proportional to the distance between the stationary mirror 18 and the position of the phase limit surface 2. The so-called control pulse generated by the mirror 18 surveys the correct operation of the transmission according to the invention. Of course, it is also possible to utilize the time interval between the control pulse 18 and the so-called measuring pulse generated by the phase limit surface 2 for remote reading of the liquid level.

Suitably a cathode ray tube 17 serves as indicating means. The voltage delivered from the scanning device is applied to the X-deflection electrode, and the voltage pulses delivered from the pulse amplifier 16 are applied to the Y-deflection electrode of the cathode ray tube. Then, on the screen of the cathode ray tube, an indication is received as illustrated schematically in Fig. 6. In this figure, the numeral 19 indicates the image screen on which the time base 20 appears. The voltage supplied by the scanning device 15 is proportional to the angle of rotation of the mirror 13 and thereby, in the first degree of approximation, also to the distance passed by the pencil of rays along the glass gauge. The time line of the cathode ray tube may be provided with a suitable calibration scale 21. The pulses delivered by the amplifier 16 appear on the time base 21 in the form of a pointed part 23, the position of which depends upon the respective position of the phase limit surface 2. The stationary mirror 18 produces a pointed control part 22. The distance between the pointed parts 22 and 23 characterizes the scanned liquid level.

Figure 6:
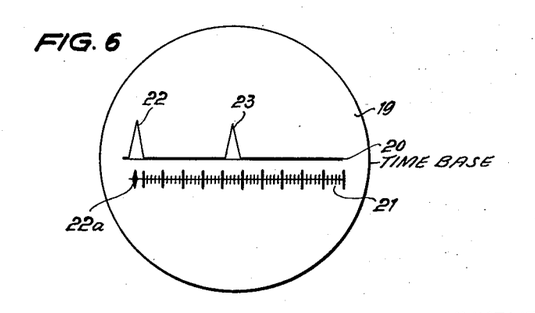
Fig. 6 shows the image screen of a cathode ray tube.

If the pointed control part 22 appears at the place determined by the mark 20a, it is a sure proof of the correct operation of the transmission method according to the invention. If simultaneously a pointed part 23 fails to appear it may be recognized that the liquid level cannot be measured any more.

For registering the pulses generated by scanning the glass gauge and indicating the liquid level, other devices known per se may be used instead of the cathode ray tube; e.g. loop-oscillographs or upwardly and downwardly moving light signals.

From the foregoing explanation it may be seen that, for the purpose of measuring and remote reading of liquid levels in a glass gauge, four different devices co-operating in the manner shown in Fig. 5 are required, namely A device scanning the glass gauge,
A transmitting device transmitting the angular positions passed by the scanning device,
An amplifying device amplifying the optic-electrical pulses generated by the phase limit surface and
An indicator indicating the ascertained liquid levels.

For transmitting the angular positions of the scanning member and for indicating the ascertained measuring values, different devices may be used according to the invention.

The device for scanning optically the separating surface between the liquid and the gaseous media in the glass gauge comprises, according to Fig. 5, a light source 12, a rotating mirror 13, a receiver 14 receiving the light rays reflected from the phase limit surface and consisting, e.g., of a photoelectric cell followed by an amplifier, and a stationary mirror 18. The light source 12 produces, by usual means such as a concave mirror, lenses and diaphragms, a narrow pencil of parallel rays of high intensity, said pencil of rays being projected onto the rotating mirror driven by an electro-motor. The stationary mirror 18 is preferably located above the glass gauge containing the liquid.

The angular positions of the rotating mirror 13 during the scanning process are transmitted onto the X-deflection electrodes of a cathode ray tube or onto corresponding organs of any other suitable indicating device, either by a sweep voltage triggered by external pulses, or by a variable impedance, or by a warbled or swing of frequency, or by a sine wave voltage.

Figure 7:
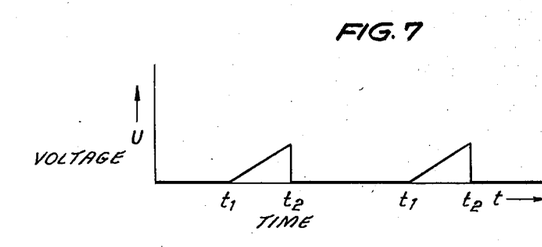
Fig. 7 illustrates the time curve of sweep voltages in a cathode ray tube.
Figure 8:
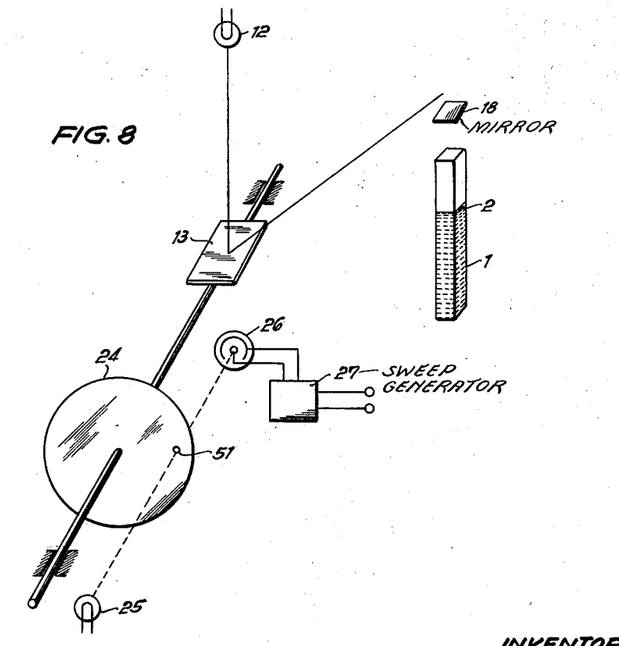
Fig. 8 illustrates the use of a sweep voltage for transmitting the position of a rotating mirror to the time deflection means of a cathode ray tube.

The use of a sweep voltage for transmitting the position of the rotating mirror to the time deflection of a cathode ray tube is explained in Figs. 7 and 8.

Fig. 7 illustrates the time curve of sweep voltages, rising periodically between the points of time $t_1$ and $t_2$ from zero up to a maximum value and then dropping suddenly to zero. Such sweep circuits may be constructed in a known manner, e.g. with Thyratron tubes or thermionic valves. For correctly synchronizing the position of the rotating mirror 13 with the increase of voltage between $t_1$ and $t_2$, the sweeping process must be released by a pulse generated mechanically, or preferably electrically by an inductor or a photoelectric cell.

In Fig. 8 a photoelectric sweep voltage release is schematically illustrated. A light ray emitted by the light source 12 is reflected first by the rotating mirror 13 and then by the phase limit surface 2 of the glass gauge 1. The axis of the rotating mirror carries a diaphragm 24 in the form of a disc provided with an opening 51 located near its circumference. Another light source 25 is arranged so as to emit a light ray which may meet the photoelectric cell 26. The path of this light ray, however, is only uninterrupted if the opening 51 of the diaphragm 24 lies on the line connecting the light source 25 and the photoelectric cell 26.

In this case the photoelectric cell 26 produces a current pulse which is applied to the aperiodic sweep generator 27 which produces a saw-tooth voltage output.

The mutual positions of the mirror 13, the perforated disc 24 and the photoelectric cell 26 are such that the production of the releasing pulse begins shortly before the moment in which the light ray scanning the glass gauge reaches the control mirror 18. The sufficiently amplified saw tooth voltage output of the sweep generator 27 increases (Fig. 7) in the first approximation proportionally to the time. As may be seen from Fig. 5, the relationship between the angle of rotation of the mirror 13 and the optically scanned extent in length along the liquid vessel is not given by a linear but by a tangent function.

If it is desired to get a linear calibration scale 21 on the screen of the indicating cathode ray tube, this may be obtained in a simple manner, e.g., by applying the voltage output of the sweep device not directly to the X-deflection electrode of the cathode ray tube, but first to the grid of a triode. By the curvature of the grid voltage anode current characteristic of the triode, the time base will be written onto the luminous screen of the cathode ray tube with variable speed. By suitably choosing the working point of the triode, the coefficient of the cyclic variation of the deflection speed may be made just as great as is practically sufficient to fulfill the correction of scale by the tangent function required for the linear registration.

Figure 9:
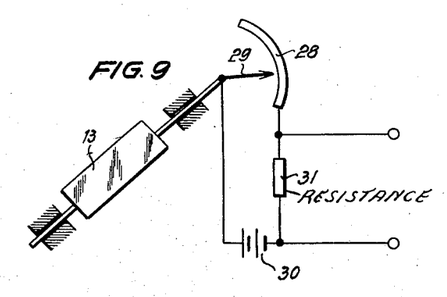
Fig. 9 shows a device in which the position of the rotating mirror is transmitted by means of electric impedances.
Figure 10:
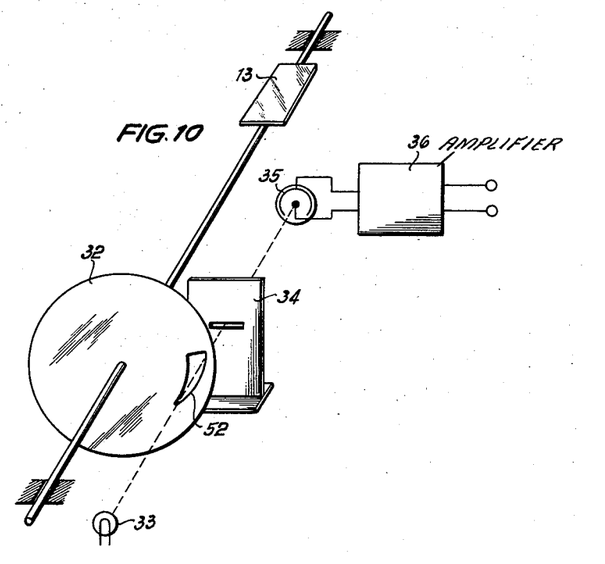
Fig. 10 is a modified construction in which the variations of the impedance are produced by a photoelectric cell.
Figure 11:
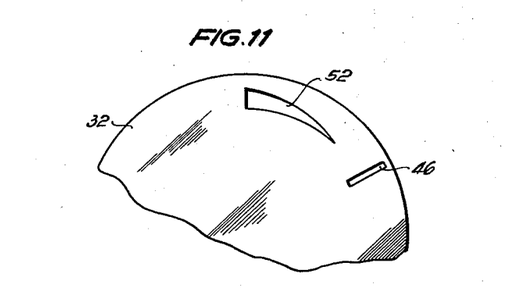
Fig. 11 is a detail of Fig. 10 on an enlarged scale.

If the position of the scanning mirror 13 is to be transmitted to an indicator, preferably to a cathode ray tube, by means of electric impedances, i.e. by varying resistances, capacities or inductances, then the arrangement shown in Figures 9–11 is used.

Referring now to Fig. 9, 28 designates a resistance along which a contact 29 slides which is firmly connected with the mirror 13 and is driven by it. A direct voltage delivered by a battery 30 is applied to the resistance 28. With such arrangement, a voltage is obtained at the resistance 31 which voltage is proportional to the angle of rotation of the mirror 13. By suitably dimensioning the resistance 28, the correction by the tangent function required for a linear transmission of the liquid level may be achieved simultaneously.

If the variations of the impedance are to be produced by a photoelectric cell, then the apparatus schematically illustrated in Fig. 10 should be used. The rotating mirror 13 is rigidly connected with a disc diaphragm 32 provided with a specially shaped opening 52. The shape of this opening is shown in Fig. 11 on an enlarged scale.

The light emitted from a light source 33 (Fig. 10) can reach the photoelectric cell 35 only through the disc diaphragm 32 and a stationary slit diaphragm 34 provided behind it. In dependence on the position of the disc diaphragm 32, the photoelectric cell 35 does not receive light at all or it receives a light stream proportional to the size of the opening 52 of the diaphragm. If the opening of the diaphragm 32 has passed the slit diaphragm 34, the light ray rests interrupted.

The opening 52 of the diaphragm 32 has such a form that the light stream passing through it is proportional to the corresponding angle of rotation of the mirror 13 with the required correction of scale by the tangent function. The peripheral length of the diaphragm opening corresponds to the angle of rotation of the mirror 13 required for scanning the total length of the glass gauge.

The voltage output of the photoelectric cell 35 is adequately amplified by an amplifier 36 and is then applied to the X-deflection electrodes of the cathode ray tube or to corresponding members of an indicating device used instead of such a tube.

Figures 12, 13:
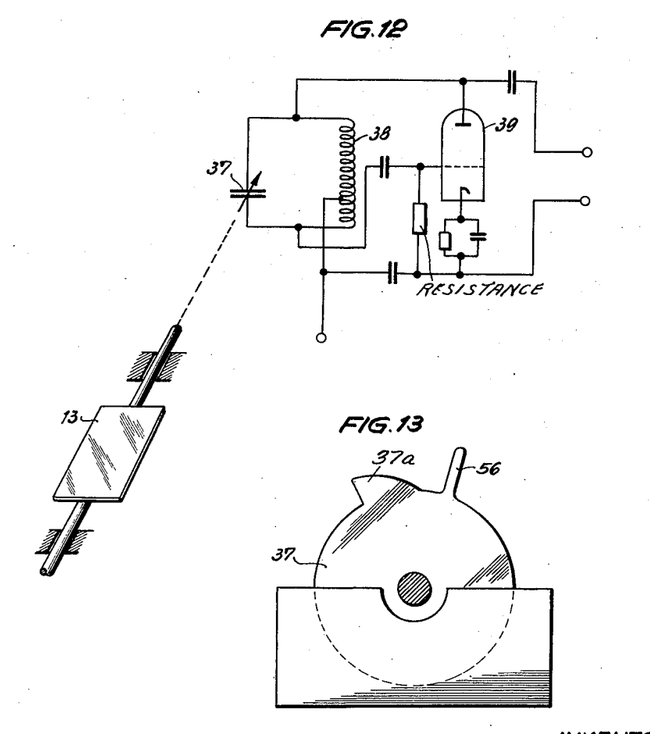
Fig. 12 shows the manner of transmitting the position of the mirror by means of a rotating condenser.
Fig. 13 is a detailed illustration of the condenser plate.

The position of the rotating mirror 13 may also be transmitted to an indicating device with the help of swing of frequency or frequency modulation by means of the apparatus illustrated in Figs. 12 and 13 of the drawings. An adjustable disc condenser 37 is fastened on the axis of the rotating mirror 13, the discs of which condenser being shaped as may be seen from Fig. 13. The adjustable disc condenser together with inductance 38 forms the reactance within an oscillating circuit comprising the capacitor 37 and the inductance 38. This oscillating circuit determines the frequency of the high-frequency voltage output of the oscillator tube 39.

In consequence of the special shape of the condenser discs, namely, the projection 37a of changing radius, a frequency variation is produced during the rotation of the adjustable disc condenser 37, said frequency variation being proportional to the angle of rotation of the condenser and thereby to the angle of rotation of the rotating mirror. The manufacture of the required condenser discs shaped so as to be proportional to the frequency is known per se in the high-frequency technique. The frequency variation of the high-frequency voltage caused by the variable capacity is, according to the invention, produced only during the scanning of the glass gauge by projection 37a.

During the other parts of rotation of the mirror the frequency remains constant.

The voltage of the oscillatory circuit 37—38 is applied to a discriminator circuit, as usual e.g. in the technique of ultra short wave receivers. Behind the discriminator the voltage has a shape as illustrated in Fig. 7. By suitably varying the form of the condenser discs indicated in Fig. 13, a correction of the scale by the tangent function may here be achieved so that the measuring part of the glass gauge is linearly transmitted to an indicating apparatus.

Figure 14:
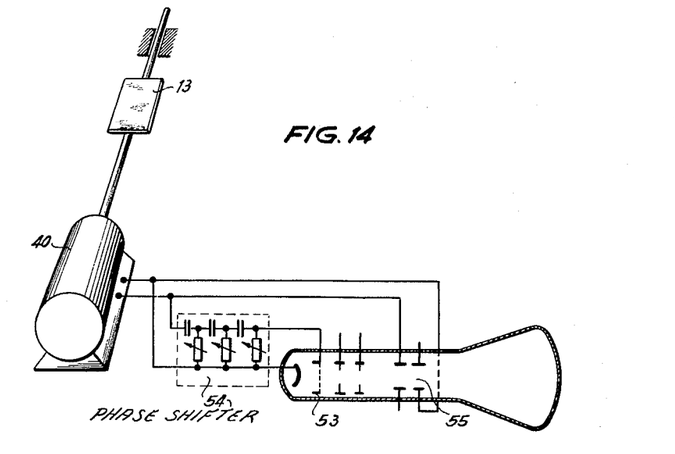
Fig. 14 shows schematically a device in which sine wave voltage is used.

Further, sine wave voltages may be used for transmitting, in a simple manner, the positions of the rotating mirror 13 to an indicator, especially to a cathode ray tube. An apparatus operating according to that method is schematically illustrated in Figures 14 and 15.

Figure 15:
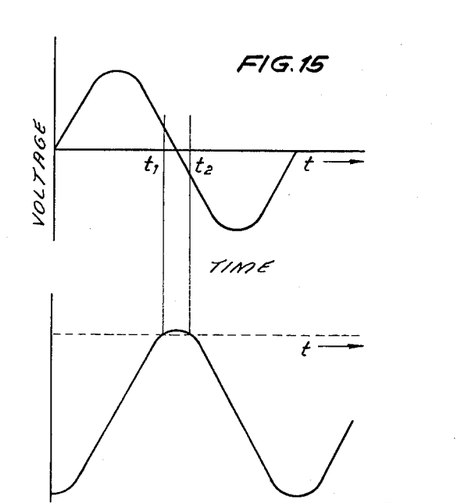
Fig. 15 illustrates the time function of a sine wave voltage.

From the time curve of a sine wave voltage illustrated in Fig. 15, it may be seen that the piece of the curve between the points $t_1$ and $t_2$ may be assumed, with good approximation, to be a straight line. Therefore, the angular position of the rotating mirror may be represented directly by a suitable cut out of the sine voltage curve. For this purpose the phases of the rotating mirror 13 and of the sine voltage are located relatively, to each other in such a way that the sine voltage passes through zero just at that moment when the scanning light ray reaches the middle of the glass gauge containing the liquid.

For the purpose of causing the cathode ray to become visible only within the time from $t_1$ to $t_2$, the control-grid 53 of the cathode ray tube is biased with a negative voltage and a brilliancy control is made by an auxiliary voltage effective only during this time period. This voltage applied to the control grid 53 and variable in time is generated by tapping a portion of the original alternating voltage and supplying the tapped portion to a phase shifter 54 in the manner shown in Fig. 14. Here the phase of this voltage is shifted by 90° with respect to the voltage on the X-deflection electrodes 55, as may be seen from the voltage-time diagram in the lower portion of Fig. 15.

An essential condition for an operation of this transmission method lies in the fact that the rotating mirror 13 is driven by a synchronous motor 40. Only under these circumstances, the phase between the rotation of the mirror 13 and the deflection voltage given by the network frequency can be kept constant. The correction of scale by the tangent function already mentioned is allowed for this case in that within the relatively small angular sphere which is used, the tangent function is approximately equal to the sine-function.

Figure 16:
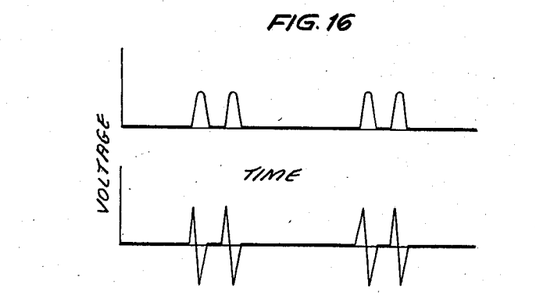
Fig. 16 shows the course of a voltage resulting from differentiating photoelectric pulses by a resistance-capacity member (RC-member)

In connection with the angular positions of the rotating mirror 13 transmitted to the indicating device, the current pulses generated by the photoelectric cell 14 (Fig. 5) must also be registered. The pulse output from the photoelectric cell 14 is first amplified for this purpose in the usual way. Because of the variations of the liquid level in the glass gauge and in the intensity of the light reflected to the photoelectric cell (which intensity depends on the reflection angle), a variable amplitude of the pulse output from the photoelectric cell 14 or the amplifier 16 respectively results. These variations of the pulse amplitude disturb the reading of the indicator. The difficulties connected therewith are removed, according to the invention, in the following way:

After being amplified, the photoelectric pulse is differentiated by a resistance-capacity-member (RC-member). From this the voltage shape illustrated in Fig. 16 results. The upper time base of the voltage curve illustrated in Fig. 16 shows the original pulse, and the lower time base shows the differentiated voltage. The differentiated pulses pulse an externally controlled multivibrator delivering pulses of constant amplitude. These pulses may be supplied directly to the Y-deflection electrode of the cathode ray tube or to corresponding members of another indicating device.

In order to get a somewhat uniform brilliancy of the image of the cathode ray, in spite of the considerably increased speed of forming the pointed parts of the pulses by the cathode ray in the cathode ray tube, a brilliancy control known per se is provided. For this purpose, the pulse voltage is tapped before being differentiated, again amplified, and then supplied to the control grid of the cathode ray tube. In this way the anode current is fully effective only during that time in which the cathode ray is forming the pulse. In the remaining time the anode current is partly suppressed. This procedure has the further advantage that the picture screen of the cathode ray tube is carefully treated. This screen would get damaged, if continuously used, by the impact of the cathode rays on a small surface area.

The indicating of the liquid levels ascertained and transmitted according to the invention has been described in the foregoing only in connection with a cathode ray tube. However, other devices may also be used as indicating devices instead of the cathode ray tube, e.g. electric pointer measuring instruments. In this connection it is of advantage if, in addition, a cathode ray tube is used because disturbances of the indications which may arise can easily be recognised because of the clearness and reliability of a cathode ray tube.

The use of electric pointer instruments has the advantage that the ascertained liquid levels may continuously be recorded by a writing instrument and that, besides, terminals may be provided releasing signals or controlling means if the adjustable predetermined values are surpassed or are not reached.

An indication by electric pointer instruments may be realized, according to the present invention, in different ways.

Figure 17:
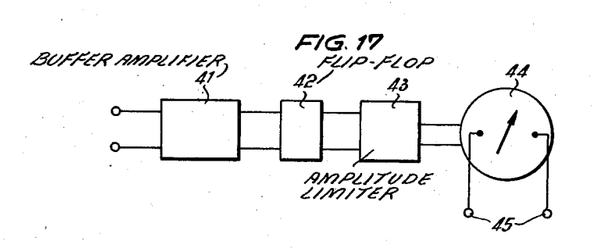
Fig. 17 shows one form of mechanism using an electric pointer instrument for indicating liquid levels.
Figure 18:
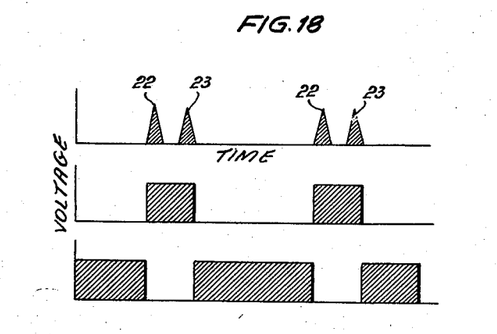
Fig. 18 illustrates the transformation of a pulse sequence by means of a scale-of-two counting unit (flip-flop)

One portion of the pulse voltage is tapped from the input applied to the Y-deflection electrode of the cathode ray tube and supplied first to a buffer amplifier 41 according to Fig. 17. In this way the following tube stages cannot influence the indication in the cathode ray tube. Behind the buffer amplifier 41 a scale-of-two counting unit (flip-flop) 42 is inserted such as is usually employed in counting tube circuits for Geiger-Müller counting tubes. By means of the scale of two counting unit (flip-flop) 42, the original pulse train illustrated in the uppermost row of Fig. 18 is transformed in the manner to be seen from the second row of Fig. 18. Of course, the scale of two counting unit 42 cannot distinguish by itself in which sequence the two pulses, i.e. the control pulse 22 and the measuring pulse 23 (Figs. 5 and 6), are to be counted. Therefore two different pulse lengths equivalent per se result, which are illustrated in the second and third rows of Fig. 18. In the second row, the desired pulse train is shown while the third row of Fig. 18 shows a pulse train produced if the scale of two counting unit 42 does not work correctly. To avoid such disadvantages, the scale of two counting unit 42 must have a forced control so that the control pulse 22 is always counted first.

Such forced control results if a signal pulse is released before beginning the scanning of the glass gauge containing the liquid, which signal pulse makes dead a predetermined tube of the pair of tubes forming the scale-of-two counting unit (flip-flop) 42 shortly before the control pulse 22 arrives, so that said tube does not receive current again before the action of the control pulse 22. In this way an indication of the correct sequence of the control pulse 22 and the measuring pulse 23 is warranted.

The manner of generating the releasing pulse for such forced control depends on the manner of generating the deflecting voltage by means of which the position of the mirror 13 is to be registered.

If the deflecting voltage for the position of the mirror 13 is produced according to Fig. 10, e.g. by rotating diaphragms, then the releasing pulse may be generated by a second opening 46 provided in the diaphragm disc 32 according to Fig. 11 at a suitable position, said second opening allowing more light to pass than the largest width of the other opening 52 required for the registration of the mirror position. In the photoelectric cell 35 (Fig. 10) a voltage pulse then arises the amplitude of which is considerably higher than the deflecting voltage for registering the position of the mirror 13. By arrangements known per se and usual, e.g. in the television techniques, such pulse may be easily taken from the sweep voltage and used for the forced control of the scale-of-two counting unit 42.

If the transmission of the angular position of the rotating mirror 13 is made according to Figs. 12 and 13 by means of an adjustable disc condenser, then the releasing pulse for the forced control of the scale-of-two counting unit 42 may be generated by providing a further pointed part 56 on the condenser plate (Fig. 13) by which the frequency swing will be increased.

In a similar way suitable pulses for the forced control of the scale-of-two counting unit 42 may be generated for the other transmission methods of the angular position of the rotating mirror 13 explained above.

Figure 19:
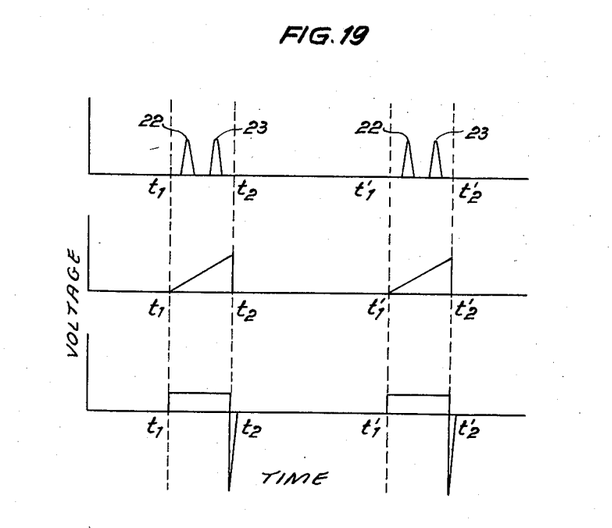
Fig. 19 illustrates the differentiation of voltage pulses by means of a resistance-capacity member.

Also the voltage pulses dependent on the position of the mirror 13 (Fig. 5) may be directly used for the forced control of the scale-of-two counting unit 42 mentioned before. For this purpose, these voltages are differentiated by means of a resistance-capacity member (RC-member). By the differentiation, the voltage curve illustrated on the time base III of Fig. 19 results. Suitably, the voltage peak directed downwardly is used for the control.

The control pulse should reach the scale-of-two counting unit 42 shortly before the control pulse 22 to be first registered arrives (Fig. 6) at the scale-of-two counting unit 42, i.e. approximately at the time $t_1$ or $t'_1$. The points of time $t_1$ and $t'_1$ are spaced from each other by the time required for one revolution of the rotating mirror 13.

The control pulse, however, is in fact generated at the points of time $t_2$ or $t'_2$ respectively (Fig. 19), which are also spaced from one another by the time of one mirror revolution. For shifting the control impulse from the times $t_2$ and $t'_2$ to the points of time $t_1$ and $t'_1$, according to the invention, a recurrent network or chain filter is used such as is usual in the information technique.

The size of the resistances or condensers respectively and their number in the said recurrent network chosen according to the invention allows the pulse applied at the point of time $t_2$ to the recurrent network to reach the scale-of-two counting unit 42 at the desired time $t'_1$ in order to control there the current through the tubes of the scale-of-two counting unit.

Figure 20:
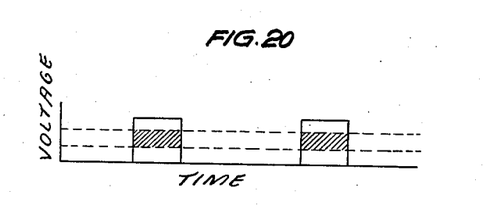
Fig. 20 shows certain parts cut out of the total amplitude of a rectangular shaped pulse.

The rectangular shaped pulses delivered by the scale-of-two counting unit 42 may be applied directly to a moving coil instrument integrating these pulses and delivering a current which, setting aside the amplitude of the pulse, corresponds to the length of the pulse, i.e. to the distance between the two peaked parts 22 and 23 (Fig. 18) and thereby to the liquid level in the glass gauge. The moving coil instrument 44 used for the mentioned purpose may easily be calibrated so as to indicate units of the liquid level in the glass gauge. Because of the unavoidable variations of the line voltage, to the wear of tubes, and to other influences, however, a constant pulse amplitude cannot be warranted with sufficient exactness. For this reason, according to the invention, behind the scale-of-two counting unit 42 an amplitude slicer or limiter 43 is inserted. By means of the latter a certain part is cut out of the total amplitude of the recangular shaped pulse, as schematically shown in Fig. 20. Such slicing or limiting of the amplitude is known from television technique but is not yet used with the remote reading of liquid levels. This also applies correspondingly to the other electric apparatus used in connection with the method according to the invention.

Behind the amplitude limiter 43, a measuring instrument 44 provided with a pointer is inserted which instrument may be devised either as a recording or as an indicating device. It may be provided with terminals and connections 45 which may be used for releasing warnings or control operations.

A recurrent network may be used in combination with every transmission apparatus used for scanning the liquid level in the glass gauge without a special pulse releasing means for the forced control of the scale-of-two counting unit 42 being required.

Figure 21:
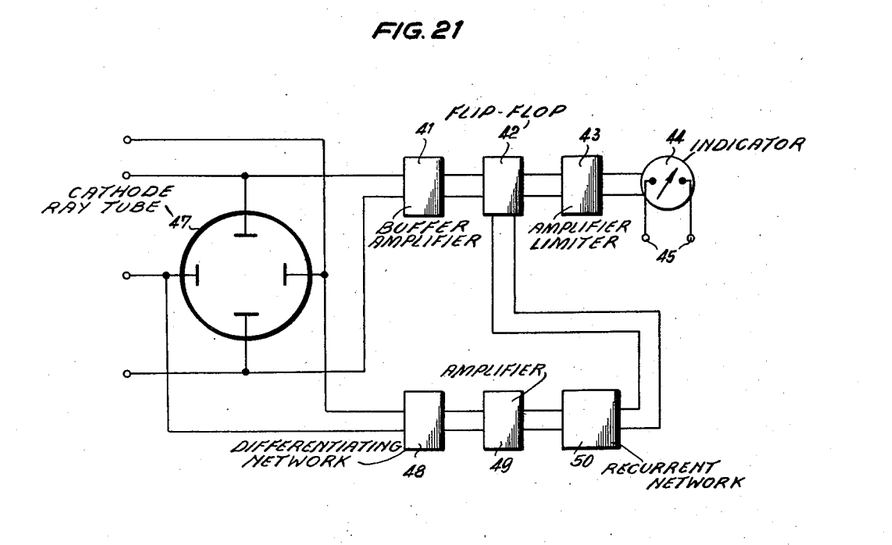
Fig. 21 is a complete wiring diagram of the indicating device.

In Fig. 21 a complete wiring diagram of the device indicating the liquid level provided with electric pointer instruments and using recurrent networks is schematically shown, for the sake of clearness.

The control or measuring pulse is taken from the vertical plates of the cathode ray tube 47 and applied to the indicating instrument 44 through a buffer amplifier 41, the scale-of-two counting unit 42 and the amplitude limiting device 43. From the other pair of plates of the cathode ray tube, the pulse corresponding to the position of the mirror is taken and applied to differentiating network 48. The differentiated voltage is amplified in the stage 49 and applied to a recurrent network 50 in the manner described above, which recurrent network applies the pulse to the scale-of-two counting unit 42 with an adequate delay.

What we claim is:

1. Apparatus for measuring the level of liquid in a glass gauge, comprising means for projecting a beam of light on the gauge at such an angle as to be reflected by the surface of liquid in the gauge, means for periodically moving the beam along the gauge while maintaining it at a substantial angle thereto, means for detecting the reflected beam and converting it into an electric impulse, and means for converting said impulse into an indication related to the time of said scanning operation.

2. Apparatus for measuring the level of liquid in a glass gauge, comprising means for rotating a beam of light about an axis located away from the longitudinal axis of the gauge and in such a position that rays from the axis to the gauge make such angles with the surface of a liquid in the gauge as to be reflected thereby, means for detecting the reflected beam and converting it into an electric impulse, and means for converting said impulse into an indication related to the time of said scanning operation.

3. Apparatus for measuring the level of liquid in a glass gauge, comprising means for emitting a light beam, means causing said beam to rotate about an axis located away from the longitudinal axis of the gauge and in such a position that rays from the axis to the gauge make such angles with the surface of a liquid in the gauge as to be reflected thereby, a fixed mirror in the path of the rotating beam, means for converting the reflections from the mirror and the liquid surface into electric impulses, and means for converting said impulses into indications comparable with one another so as to indicate the liquid level.

4. Apparatus for measuring the level of liquid in a glass gauge, comprising means for a source of light, a mirror mounted to reflect light from said source and to rotate about an axis located away from the longitudinal axis of the gauge and in such a position that rays from the axis to the gauge make such angles with the surface of a liquid in the gauge as to be reflected thereby, a fixed reflector in the path of beams from said rotating mirror, a light sensitive device in the path of beams reflected by both said fixed mirror and the surface of the liquid for converting such reflections into electrical impulses, and means connected to said device for converting said impulses into indications comparable with one another so as to indicate the liquid level.

References Cited in the file of this patent

UNITED STATES PATENTS

| | | |
|---|---|---|
| 2,110,746 | Tolson | Mar. 8, 1938 |
| 2,419,487 | Dresser | Apr. 22, 1947 |
| 2,491,591 | Sweeny et al. | Dec. 20, 1949 |
| 2,573,006 | Good | Oct. 30, 1951 |
| 2,663,857 | Holcomb | Dec. 22, 1953 |